United States Patent
Kim et al.

(10) Patent No.: US 9,471,101 B2
(45) Date of Patent: Oct. 18, 2016

(54) WEARABLE COMPUTING DEVICE AND USER INTERFACE METHOD

(71) Applicant: LG ELECTRONICS INC., Seoul (KR)

(72) Inventors: Jongho Kim, Seoul (KR); Sinae Chun, Seoul (KR); Eunhyung Cho, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/167,406

(22) Filed: Jan. 29, 2014

(65) Prior Publication Data

US 2015/0070251 A1    Mar. 12, 2015

(30) Foreign Application Priority Data

Sep. 11, 2013    (KR) .................. 10-2013-0109116

(51) Int. Cl.
*G02B 27/01* (2006.01)
*G06F 1/16* (2006.01)
*G06F 3/16* (2006.01)

(52) U.S. Cl.
CPC ............. *G06F 1/163* (2013.01); *G06F 3/165* (2013.01); *G02B 27/017* (2013.01); *G02B 2027/0178* (2013.01)

(58) Field of Classification Search
CPC .............. G02B 2027/0178; G06F 1/1605; G06F 1/163; G06F 3/165; G06F 1/1637; G06F 1/1688

USPC .............................................. 345/8; 381/151
See application file for complete search history.

(56) References Cited

U.S. PATENT DOCUMENTS 8,264,422 B1    9/2012    Persson et al.
2002/0158816 A1    10/2002    Snider
(Continued)

FOREIGN PATENT DOCUMENTS

JP    2012-170075 A    9/2012
KR    10-2013-0000401 A    1/2013
(Continued)

*Primary Examiner* — Lun-Yi Lao
*Assistant Examiner* — Ibrahim Khan
(74) *Attorney, Agent, or Firm* — Birch, Stewart, Kolasch & Birch, LLP

(57) ABSTRACT

A wearable computing device receiving at least one of visual information and audible information from an information providing device and providing the received information to a user is disclosed. The wearable computing device includes a detecting unit detecting a state of the wearable computing device and outputting detection information, a controller deciding whether the state of the wearable computing device corresponds to a first mode or a second mode based upon the detection information of the detecting unit, and controlling an output of the visual information and the audible information provided by the information providing device based upon the decided mode, a converter converting the visual information provided by the information providing device to audible information of a voice format when the state corresponds to the second mode, and an audible information output unit providing the audible information converted by the converter to the user.

18 Claims, 10 Drawing Sheets

(56) References Cited

U.S. PATENT DOCUMENTS

2009/0168131 A1    7/2009  Yamaguchi et al.
2011/0194029 A1*   8/2011  Herrmann ............ G02B 27/017
                                                        348/569
2011/0273365 A1*  11/2011  West .................. G02B 27/0176
                                                          345/8
2012/0007800 A1    1/2012  Jaroslaw
2012/0208465 A1    8/2012  Choi et al.
2012/0218172 A1*   8/2012  Border ............... G02B 27/0093
                                                          345/8
2013/0018659 A1    1/2013  Chi
2013/0022220 A1    1/2013  Dong et al.
2013/0069787 A1*   3/2013  Petrou ................. G02B 27/017
                                                        340/573.1
2013/0169620 A1    7/2013  Choi et al.

FOREIGN PATENT DOCUMENTS

KR    10-2013-0067902 A    6/2013
KR    10-2013-0077744 A    7/2013
WO    WO 2011/106798 A1    9/2011

\* cited by examiner (a)

(b)

(a)          (b)

(a)

(b)

(c)

WEARABLE COMPUTING DEVICE AND USER INTERFACE METHOD

Pursuant to 35 U.S.C. §119(a), this application claims the benefit of earlier filing date and right of priority to Korean Application No. 10-2013-0109116, filed on Sep. 11, 2013, the contents of which are hereby incorporated by reference herein in their entirety.

BACKGROUND OF THE DISCLOSURE

1. Field of the Disclosure

The present specification relates to a wearable computing device that can be worn on at least one body part of a user and, more particularly, to a user interface method in a wearable computing device that can be worn on the face.

2. Discussion of the Related Art

In a wearable computing device, a device worn either on the head or on the face is referred to as a Head Mounted Display (HMD) of a Face Mounted Display (FMD).

Such a wearable computing device is composed of an image module including an LCD, and so on, which generates images, and an optical system, such as a lens, and so on, which enables the generated image to be formed as a virtual image at a predetermined distance from the user.

Figure 1:
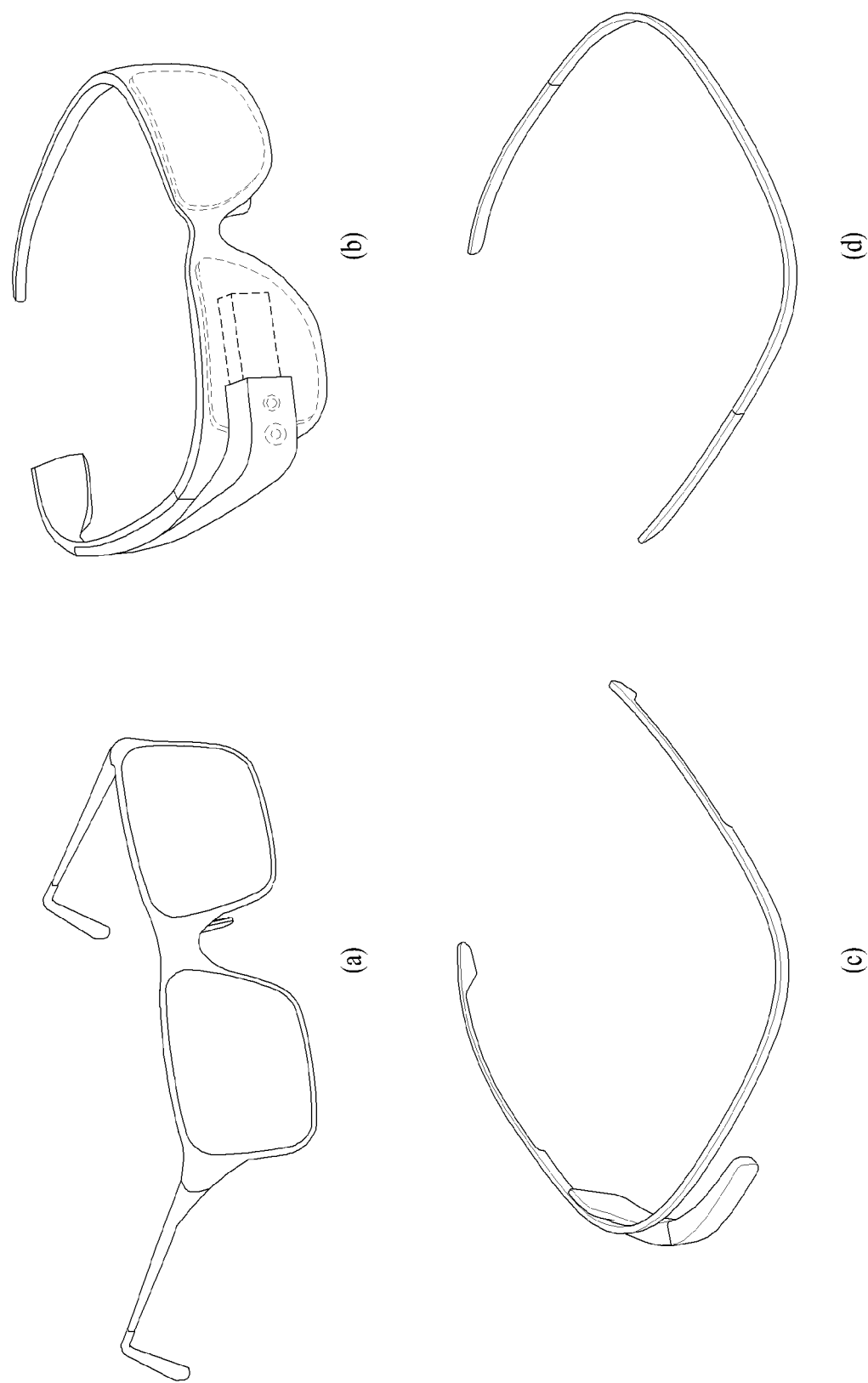

(a) to (d) of FIG. 1 respectively illustrate diverse forms of wearable computing devices. As shown in (a) to (d) of FIG. 1, the wearable computing device may have a wide range of forms, and the device form may correspond to any device type can be worn on the head or face. For example, diverse forms, such as a eye glasses type (or viewing glasses type) shown in (a) of FIG. 1, a sunglasses type shown in (b) of FIG. 1, and hair band types (or head band or head set types) shown in (c) and (d) of FIG. 1, may be provided.

The wearable computing device shown in (a) to (d) of FIG. 1 provides images and/or sound (or voice) through a display and/or speakers. Most particularly, a general method of the wearable computing device is to be equipped with a compact display device, such as a liquid crystal display, located near both eyes, so that images can be projected through the compact display device.

Figure 2:
Figure 2:

At this point, the user may wear (or put) the wearable computing device on his (or her) face, as shown in (a) of FIG. 2, or the user may place (or wear or put) the wearable computing device on his (or her) head, as shown in (b) of FIG. 2, or may completely take off the device (or dismount the device) from his (or her) face or head. However, as shown in (b) of FIG. 2, when the user places (or wears or puts) the wearable computing device on his (or her) head, visual information that was viewed through the eyes of the user or audible information that was heard through the user's ears so far (or up until the point of taking the device off) is no longer provided to the user. In this case, there occurs a problem in that the user's need and request to be continuously provided with the wanted information, even if the wearable computing device is placed on the user's head, cannot be satisfied and met.

SUMMARY OF THE DISCLOSURE

In order to resolve the above-described problems, an object of the present specification is to provide a wearable computing device and a user interface method that can enable the user to be provided with audible information even when the wearable computing device is in a state of being placed (or worn) on the user's head.

Another object of the present specification is to provide a wearable computing device and a user interface method that can convert visual information to audible information, so that the converted audible information can be provided to the user, when the user is in a state of wearing the wearable computing device on his (or her) head.

In order to achieve the above-described object of the present specification, a wearable computing device according to the description of the present specification may include a detecting unit configured to detect a state of the wearable computing device and output detection information, a controller configured to determine whether the state of the wearable computing device corresponds to a first mode or a second mode based on the detection information of the detecting unit, and control an output of at least one of visual information and audible information provided by an information providing device based on the determined mode, a converter configured to convert the visual information provided by the information providing device to audible information of a voice format when the state corresponds to the second mode, and an audible information output unit configured to provide the audible information converted by the converter to the user. Herein, the first mode corresponds to a state where a display unit of the wearable computing device is placed in front of the user's eyes, while the audible information output unit is placed inside or near the user's ears, and the second mode corresponds to a state where the display unit of the wearable computing device is not placed in front of the user's eyes, while the audible information output unit is placed inside or near the user's ears.

According to an embodiment of the present specification, the first mode corresponds to a state where the wearable computing device is worn on the user's face, and the second mode corresponds to a state where the wearable computing device is placed on the user's head.

According to an embodiment of the present specification, the visual information corresponds to at least one of an image, a text message, a notification message, subtitle information, and schedule information.

According to an embodiment of the present specification, the information providing device further includes a camera unit capturing the visual information, and the controller controls the converter so as to convert the captured visual information to the audible information of the voice format when the state corresponds to the second mode.

According to an embodiment of the present specification, the converted audible information includes at least one of road guidance information and urgent and/or unexpected situation guidance information.

According to an embodiment of the present specification, the converter converts to the audible information of the voice format based on the captured visual information, current location information, and map information.

According to an embodiment of the present specification, when an output mode corresponds to an audible mode in the second mode, the controller performs control operations so that the audible information converted by the converter can be outputted to the audible information output unit.

According to an embodiment of the present specification, when an output mode corresponds to a stand-by mode in the second mode, the controller performs control operations so that the visual information and the audible information cannot be provided to the user.

According to an embodiment of the present specification, the wearable computing device further includes a visual information processing unit configured to perform video-processing on the visual information provided by the information providing device, and an audible information processing unit configured to perform audio-processing on the audible information provided by the information providing device. Herein, the display unit displays the visual information processed by the visual information processing unit.

According to an embodiment of the present specification, when the state corresponds to the first mode, the controller performs control operations so that the visual information processing unit and the display unit can be operated, and when the state corresponds to the second mode, the controller performs control operations so that the visual information processing unit and the display unit cannot be operated.

According to an embodiment of the present specification, when the state corresponds to the first mode, the controller performs control operations so that the audible information processed by the audible information processing unit can be outputted to the audible information output unit, and when the state corresponds to the second mode, the controller performs control operations so that at least one of the audible information processed by the audible information processing unit and the audible information converted by the converter can be outputted to the audible information output unit.

According to an embodiment of the present specification, when the wearable computing device is changed the second mode to the first mode, the controller performs control operations so that at least a portion of the visual information having been converted to the audible information in the second mode can be displayed.

According to an embodiment of the present specification, the wearable computing device further includes a storage unit configured to store at least a portion of the visual information converted to the audible information in the second mode.

According to an embodiment of the present specification, the storage unit stores at least a portion of the visual information converted to the audible information in the second mode only during a predetermined period of time based upon the control of the controller.

According to an embodiment of the present specification, when the visual information that has been converted to the audible information in the second mode corresponds to multiple events, the controller performs control operations so that visual information of at least one event can be displayed by an order of a highest priority level.

According to an embodiment of the present specification, when the visual information that has been converted to the audible information in the second mode corresponds to multiple events, the controller performs control operations so that visual information of at least one event can be displayed by an order of events most recently provided to the user as audible information.

According to an embodiment of the present specification, the controller performs control operations so that visual information that has been converted to the audible information in the second mode can be displayed in the form of at least one of a summary, an overall content, a highlight, a thumbnail, and a fast screen.

According to an embodiment of the present specification, the detecting unit consists of at least one sensor sensing movements of the wearable computing device and status of the wearable computing device, and the sensing unit is provided in at least one of a nose resting part, an edge portion of a right leg part, and an edge portion of a left leg part of the wearable computing device.

According to an embodiment of the present specification, the audible information output unit comprises at least one of an air conduction speaker and a bone conduction speaker, and the audible information is provided to the user through at least one of the air conduction speaker and the bone conduction speaker.

According to an embodiment of the present specification, a user interface method of a wearable computing device may includes detecting a state of the wearable computing device, processing at least one of visual information and audible information provided by an information providing device, outputting the processed visual information to a display unit and outputting the processed audible information to a speaker when the detected state is a first mode, and converting the visual information provided by the information providing device to audible information of a voice format, outputting the converted audible information to the speaker when the detected state is a second mode. Herein, the first mode corresponds to a state where the display unit of the wearable computing device is placed in front of the user's eyes, while the speaker is placed inside or near the user's ears, and the second mode corresponds to a state where the display unit of the wearable computing device is not placed in front of the user's eyes, while the speaker is placed inside or near the user's ears.

Figure 3:
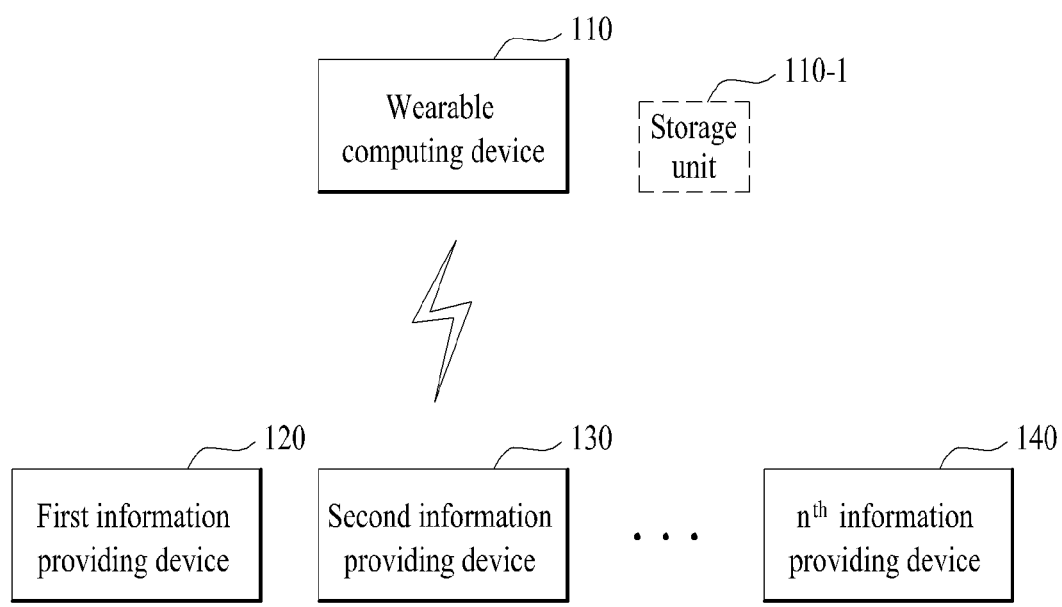
Figure 4:
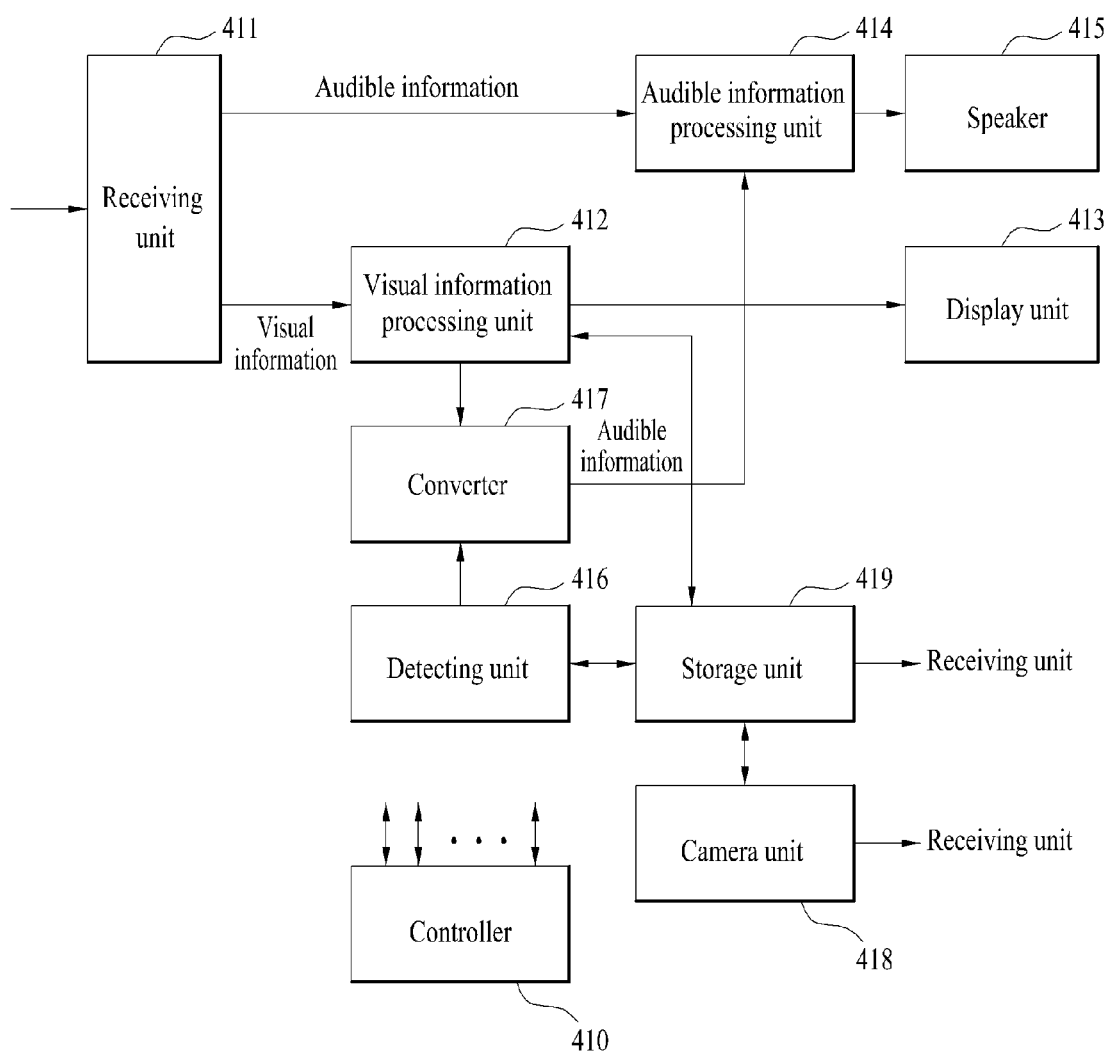
Figure 5:
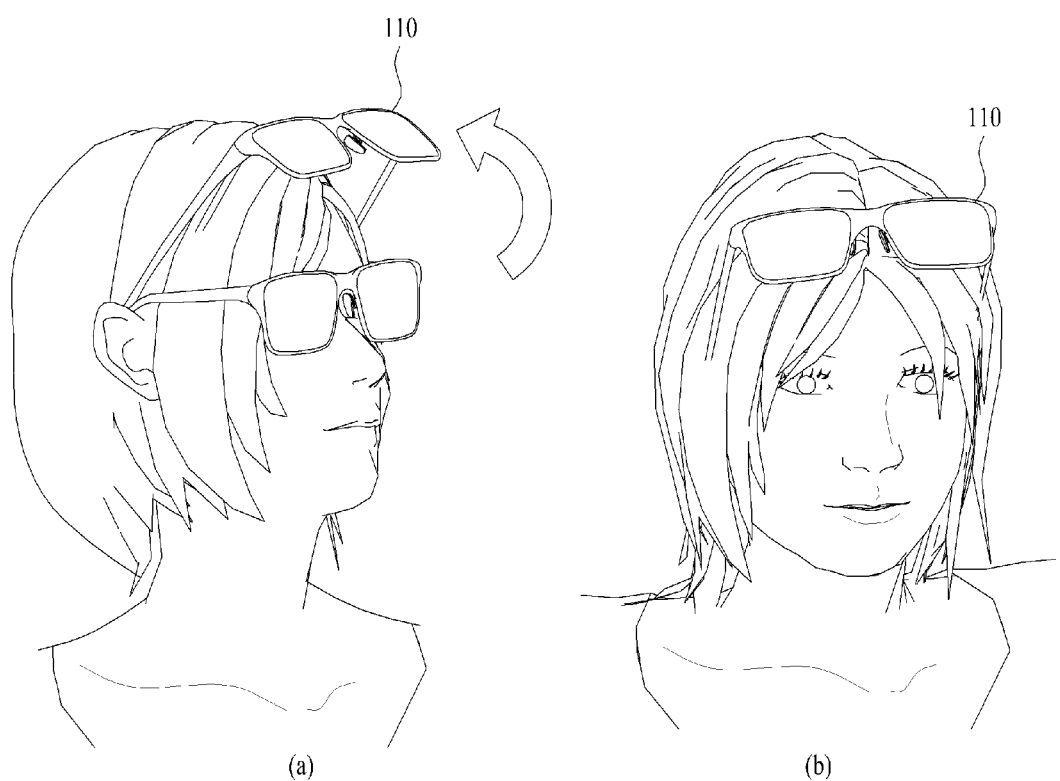
Figure 6:
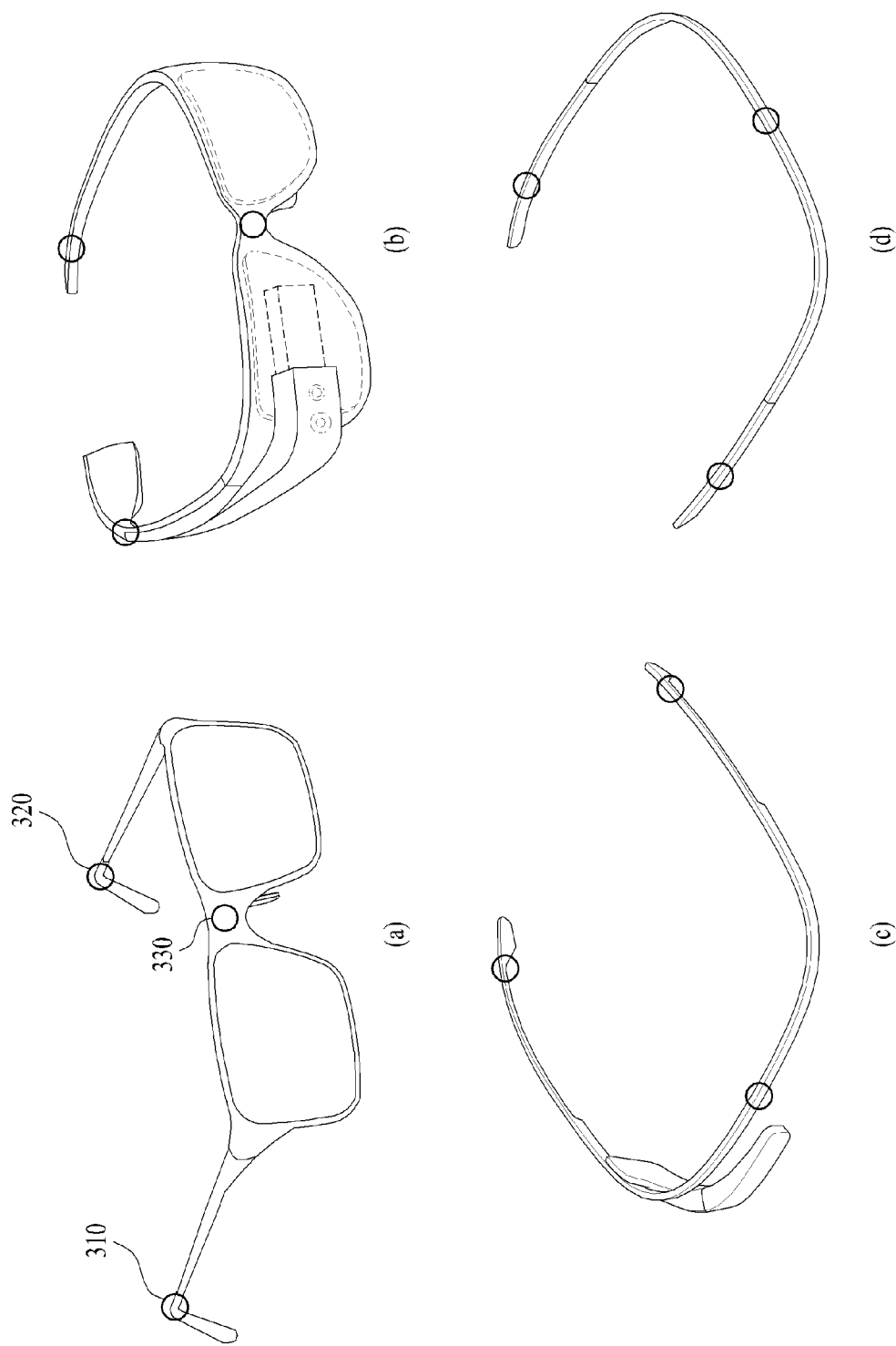
Figure 7:
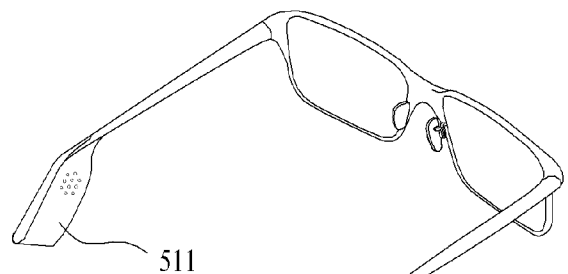
Figure 7:
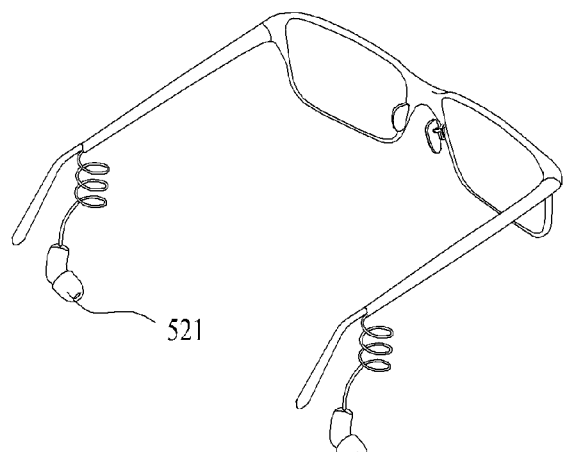
Figure 7:
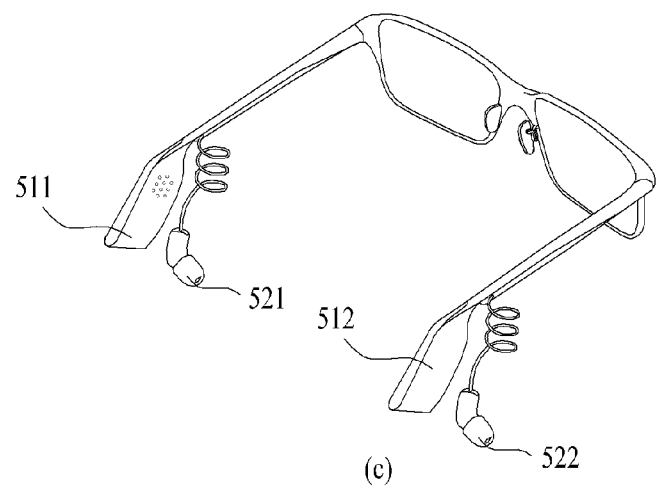
Figure 8:
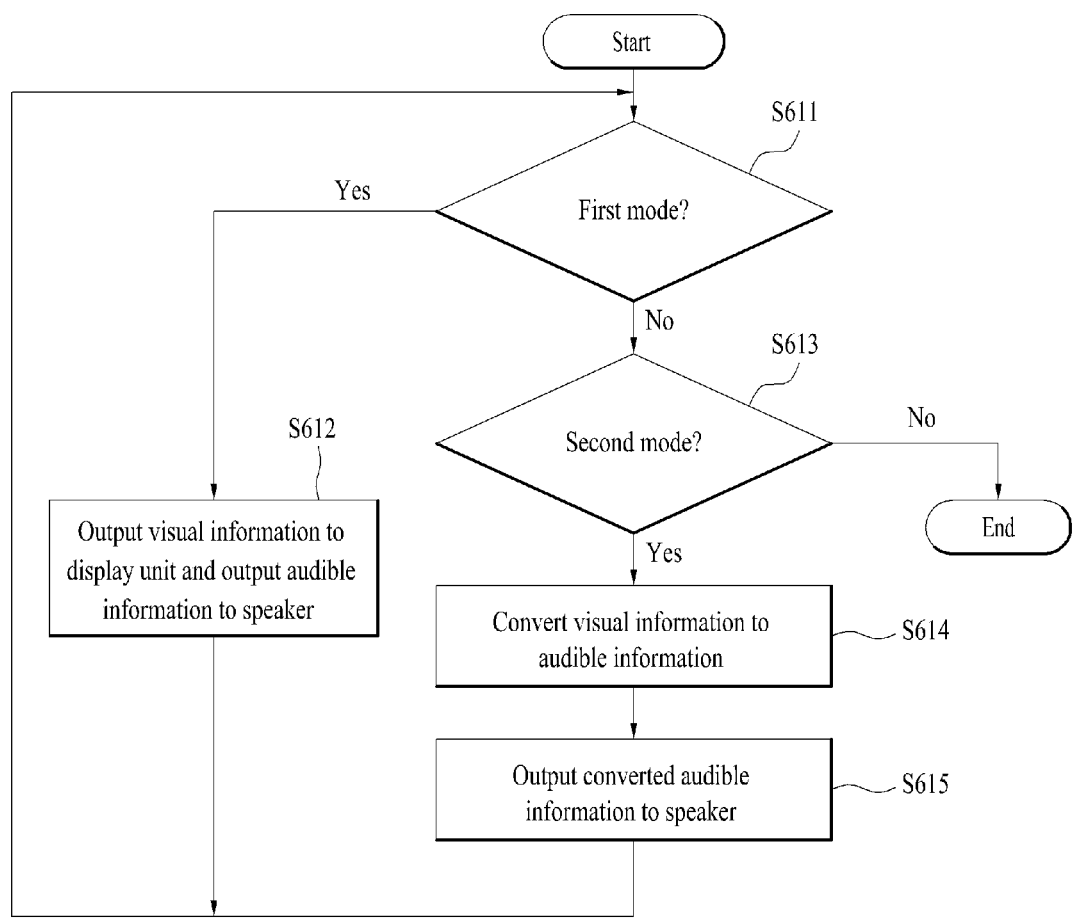
Figure 9:
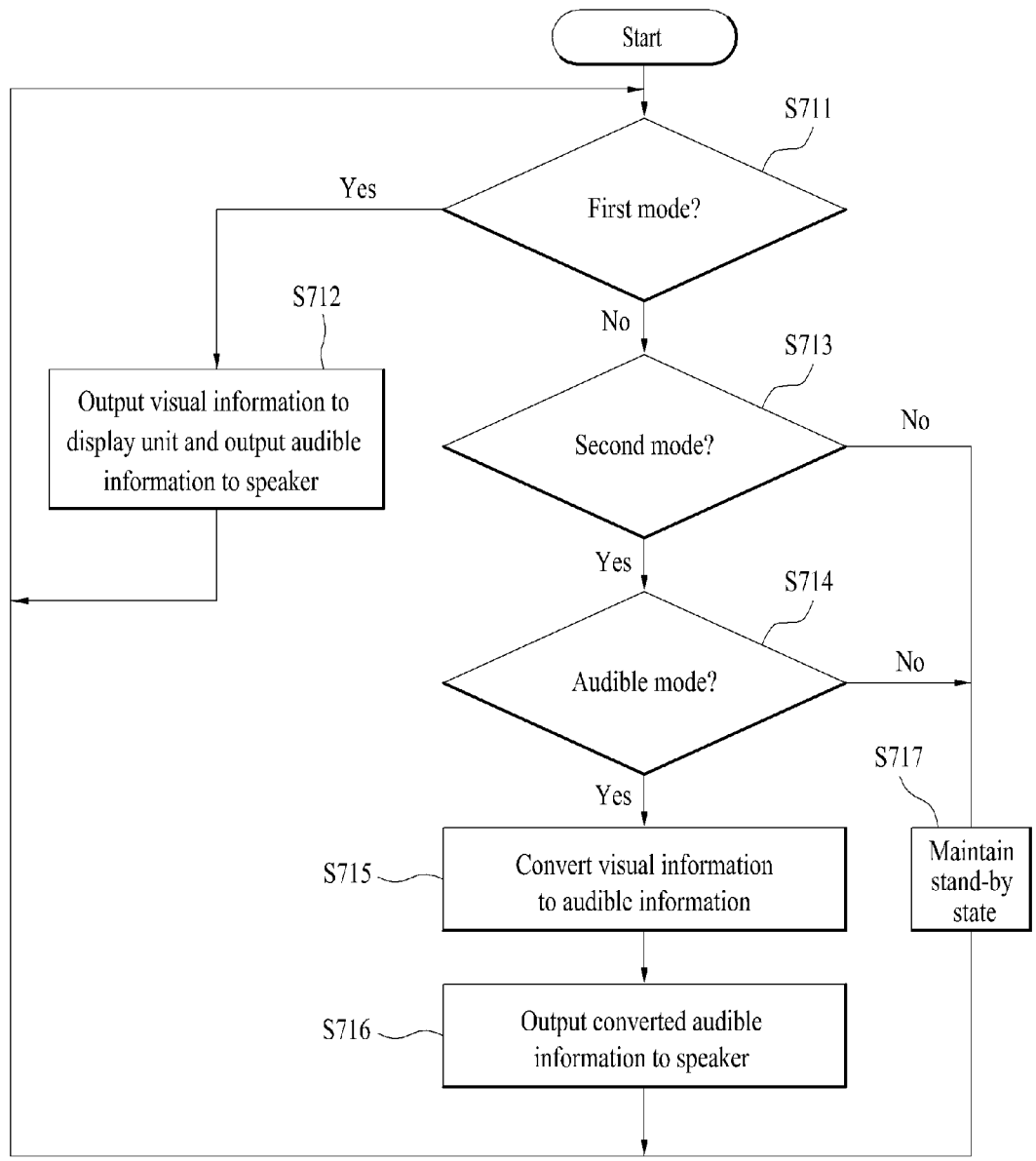
Figure 10:
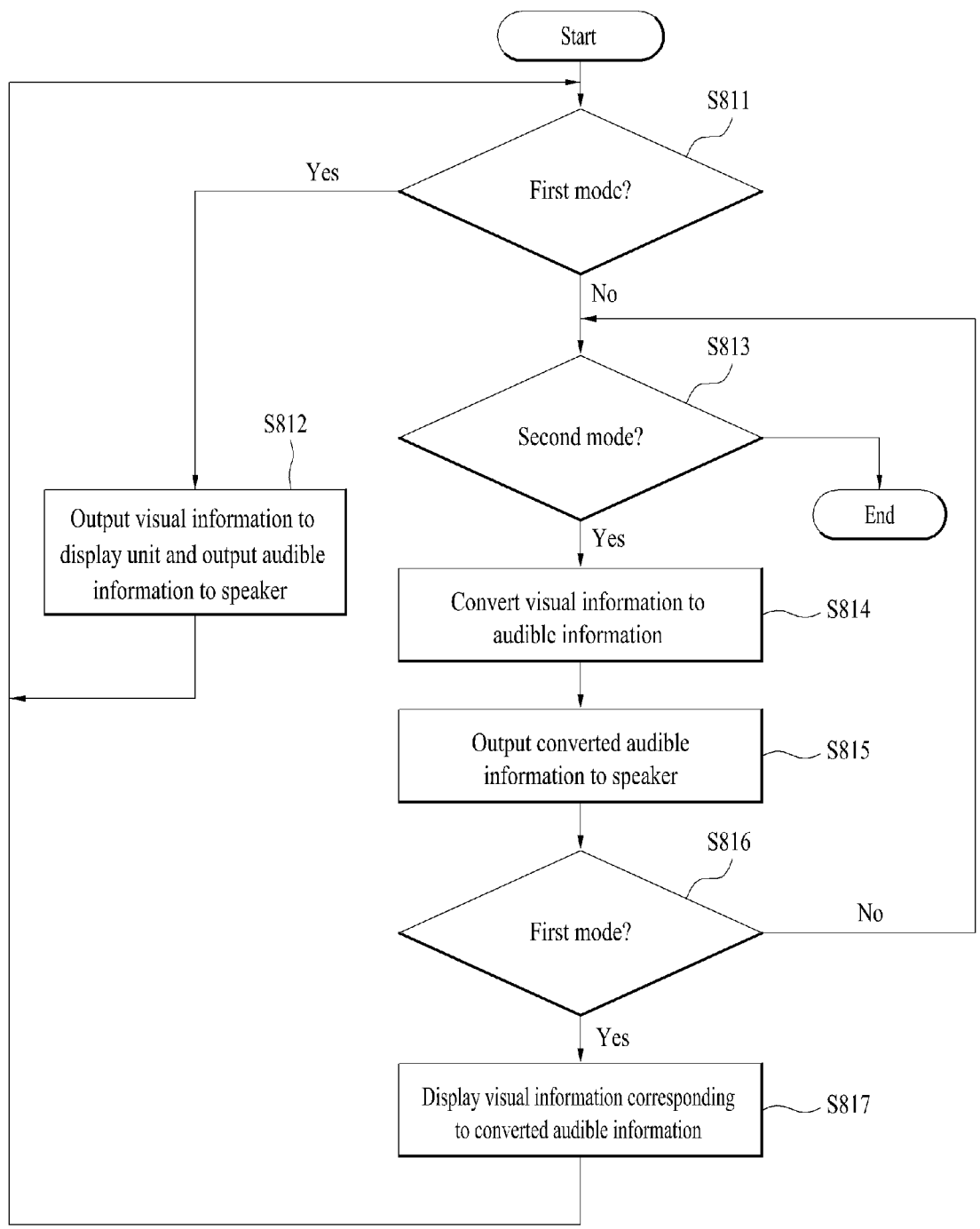

BRIEF DESCRIPTION OF THE DRAWINGS (a) to (d) of FIG. 1 respectively illustrate diverse forms of wearable computing devices, (a) and (b) of FIG. 2 respectively illustrate an example of a wearable computing device worn on a user's face and an example of a wearable computing device worn on the user's head, FIG. 3 illustrates a general diagram showing a relation between a wearable computing device and an information providing device according to the present specification, FIG. 4 illustrates a block diagram showing a structure of a wearable computing device according to an exemplary embodiment of the present specification, (a) of FIG. 5 illustrates an example of a wearable computing device being worn on a user's face and then repositioned on the user's head according to the present specification, (b) of FIG. 5 illustrates an example of the wearable computing device being worn and placed on the user's head according to the present specification, (a) to (d) of FIG. 6 respectively show exemplary installed positions of a detection unit including at least one sensor in diverse forms of the wearable computing device according to the present specification, (a) to (c) of FIG. 7 respectively illustrate installation examples of bone conduction speakers and air conduction speakers in the wearable computing device according to the present specification, FIG. 8 illustrates a flow chart showing a user interface method of the wearable computing device according to an exemplary embodiment of the present specification, FIG. 9 illustrates a flow chart showing a user interface method of the wearable computing device according to another exemplary embodiment of the present specification, and FIG. 10 illustrates a flow chart showing a user interface method of the wearable computing device according to yet another exemplary embodiment of the present specification.

DESCRIPTION OF SPECIFIC EMBODIMENTS

Hereinafter, preferred exemplary embodiments of the present specification that can best carry out the above-described objects of the preset specification will be described in detail with reference to the accompanying drawings. At this point, the structure or configuration and operations of the present specification, which are illustrated in the drawings and described with respect to the drawings, will be provided in accordance with at least one exemplary embodiment of the present specification. And, it will be apparent that the technical scope and spirit of the present specification and the essential structure and operations of the present specification will not be limited only to the exemplary embodiments set forth herein.

In addition, although the terms used in the present specification are selected from generally known and used terms, the terms used herein may be varied or modified in accordance with the intentions or practice of anyone skilled in the art, or along with the advent of a new technology. Alternatively, in some particular cases, some of the terms mentioned in the present specification may be selected by the applicant at his or her discretion, the detailed meanings of which are described in relevant parts of the description herein. Furthermore, it is required that the present specification is understood, not simply by the actual terms used but by the meaning of each term lying within.

Specific structural and functional description of the present specification respective to the exemplary embodiments, which are provided in accordance with the concept of the present specification disclosed in the present specification, is merely an exemplary description provided for the purpose of describing the exemplary embodiments according to the concept of the present specification. And, therefore, the exemplary embodiment of the present specification may be realized in diverse forms and structures, and, it should be understood that the present specification is not to be interpreted as being limited only to the exemplary embodiments of the present specification, which are described herein.

Since diverse variations and modifications may be applied to the exemplary embodiments according to the concept of the present specification, and, since the exemplary embodiments of the present specification may be configured in diverse forms, specific embodiment of the present specification will hereinafter be described in detail with reference to the examples presented in the accompanying drawings. However, it should be understood that the exemplary embodiments respective to the concept of the present specification will not be limited only to the specific structures disclosed herein. And, therefore, it should be understood that all variations and modifications, equivalents, and replacements, which are included in the technical scope and spirit of the present specification, are included.

Additionally, in the present specification, although terms such as first and/or second may be used to describe diverse elements of the present specification, it should be understood that the elements included in the present specification will not be limited only to the terms used herein. The above-mentioned terms will only be used for the purpose of differentiating one element from another element, for example, without deviating from the scope of the present specification, a first element may be referred to as a second element, and, similarly, a second element may also be referred to as a first element.

Moreover, throughout the entire description of the present specification, when one part is said to "include (or comprise)" an element, unless specifically mentioned otherwise, instead of excluding any other element, this may signify that the one part may further include other elements. Furthermore, the term "unit (or part)", which is mentioned in the present specification, refers to a unit for processing at least one function or operation, and this may be realized in the form of hardware, software, or in a combination of both hardware and software.

The present specification relates to continuously providing the user with information without any interruption even when the wearable computing device is shifted from changed a first mode to a second mode. According to an exemplary embodiment of the present specification, the first mode corresponds to a state where a display unit of the wearable computing device is placed in front of the user's eyes, while an audible information output unit is placed inside or near the user's ears, and the second mode corresponds to a state where the display unit of the wearable computing device is not placed in front of the user's eye, while the audible information output unit is placed inside or near the user's ears.

Preferably, the present specification relates to continuously providing the user with information without any interruption even when the user first wears the wearable computing device on his (or her) face and then slips (or places) the wearable computing device on the user's head. Most particularly, the present specification relates to converting visual information, which is seen (or viewed) through the eyes, to audible information, which is heard through the ears, and to providing the converted audible information to the user when the user slips the wearable computing device on his (or her) head.

FIG. 3 illustrates a general diagram showing a relation between a wearable computing device and an information providing device according to the present specification.

The wearable computing device 110 of FIG. 3 processes visual information and/or audible information and provides the processed information to the user.

At this point, the visual information and/or the audible information is provided from at least one of an external information providing devices 120-140, a memory (or referred to as a storage unit), which is embedded inside the wearable computing device 110, and a storage medium 110-1 detachably fixed to the wearable computing device 110. If a camera is mounted on the wearable computing device 110, the wearable computing device 110 may be provided with still images or moving picture images recorded (or captured) by the camera as visual information and/or audible information.

The storage medium 110-1 may include at least one of a memory of a slot type, such as an SD (Secure Digital) or CF (Compact Flash) memory, a memory of a stick type, a memory of a USB (Universal Serial Bus) type. More specifically, the storage medium 110-1 may be detachably fixed to the wearable computing device 110, and any type of storage medium that can provide visual information and/or audible information to the wearable computing device 110 may be used.

According to the exemplary embodiment of the present specification, the memory that is embedded in the wearable computing device 110 corresponds to a storage medium that can read, write, and remove (or delete).

The information providing devices 120~140 is connected to the wearable computing device 110 through wired or wireless connection, and any device that can provide visual information and/or audible information to the wearable computing device 110 may be used herein. For example, the information providing devices 120~140 may either correspond to a mobile terminal or may correspond to a fixed terminal. The mobile terminal may correspond to a mobile phone, a smart phone, a tablet PC (Personal Computer), a smart pad, a notebook, a digital broadcasting terminal, a PDA (Personal Digital Assistants), PMP (Portable Multimedia Player), a digital camera, a navigation (or navigator), and so on, and the fixed terminal may correspond to a desktop, a DVD (Digital Video Disc or Digital Versatile Disc) player, a TV, and so on.

The wearable computing device 110 and the information providing devices 120~140 may transmit/receive information via wired or wireless connection. For example, in case of a wired connection, an interface, such as HDMI (High Definition Multimedia Interface) or DVI (Digital Visual Interface), may be supported. In another example, in case of a wireless connection, 2G, 3G, and 4G mobile communication types, such as GSM (Global System for Mobile Communications) or CDMA (Code Division Multiple Access), Wibro, and other mobile communication types, such as HSPA (High Speed Packet Access), LTE (Long Term Evolution), and so on, or close-range communication type interfaces, such as Bluetooth, RFID (Radio Frequency Identification), IrDA (infrared Data Association), UWB (Ultra Wideband), Zigbee, Wi-Fi, and so on, may be supported.

Herein, the wireless/wired interface types are exemplary embodiments provided to facilitate the understanding of the present specification, and, therefore, since the interface types for transmitting/receiving information may be easily varied or modified by anyone skilled in the art, in the present specification, the interface types will not be limited only to the exemplary embodiments presented and mentioned herein.

In FIG. 3, a set-top box (not shown) may be further provided between the wearable computing device 110 and the information providing devices 120~140. The set-top box may only perform the function of delivering (or transporting) visual information and/or audible information from the information providing devices 120~140 to the wearable computing device 110, or the set-top box may also perform some of the functions of the wearable computing device 110.

According to the exemplary embodiment of the present specification, the characteristic of converting visual information to audible information is performed by the wearable computing device 110. However, this is merely an exemplary embodiment provided to facilitate the understanding of the present specification, and, therefore, the corresponding characteristic may also be performed by the set-top box or the information providing device.

In the present specification, any type of information that can be seen (or viewed) through the eyes, such as moving picture images, still images, text messages, notification messages, schedule information, subtitle information, and so on may be used as the visual information. For example, if the information providing device being connected to the wearable computing device 110 corresponds to a smart phone, a moving picture image or a still image stored in the smart phone, a moving picture image or a still image captured (or recorded) by the smart phone, a text message received by the smart phone, a notification message notifying the user of reservation or pre-set information stored in the smart phone, subtitle information, and so on, may correspond to the visual information.

For example, the moving picture image may correspond to a TV series (or drama), a movie, a music video, and so on, and the still image may correspond to a photo (or picture) or a drawing, and so on. And, the text message may correspond to a text message received by the corresponding smart phone, and the notification message may correspond to a message notifying the user of information, such as reserved viewing or reserved recording, or may correspond to a message notifying the user of birthdays or other schedule.

And, at the prearranged date and time, when an alarm message notifying the user of the prearranged schedule corresponds to a format that can be viewed through the eyes (e.g., text), the alarm message corresponds to visual information, and when an alarm message notifying the user of the prearranged schedule corresponds to a format that can be heard through the ears (e.g., music or voice (or sound)), the alarm message corresponds to audible information. For example, both visual information and audible information exist in a moving picture image.

In the present specification, audible information refers to information that can be heard through the ears. For example, the audible information corresponds to all type of sound within a frequency range audible to the human ear. As shown in (a) of FIG. 2, when the wearable computing device 110 is in a state of being worn on the user's face, visual information is video-processed by the wearable computing device 110 and then outputted to the display unit so that the user can view the corresponding information, and, audible information is audio-processed and outputted to speakers so that the user can hear the corresponding information. In the present specification, the speakers will also be referred to as the audible information output unit.

However, as shown in (b) of FIG. 2, when the wearable computing device 110 is in a state placed (or slipped) on the user's head, visual information is converted to audible information, which is then outputted to the speakers so that the user can hear the corresponding information. According to the exemplary embodiment of the present specification, visual information is converted to audible information of a voice format. At this point, the video-processing of the visual information is optional.

More specifically, in the state shown in (b) of FIG. 2, visual information may only be converted to audible information, which can be heard by the user, and not be displayed, or the visual information may be converted to audile information and then be outputted to the speakers, while the visual information is still being displayed on the display unit.

According to the exemplary embodiment of the present specification, in the state shown in (b) of FIG. 2, the visual information is converted to a voice (or sound), so as to be provided to the user.

Additionally, for simplicity, in the present specification, a state where the display unit of the wearable computing device is placed in front of the user's eyes, while the audible information output unit is placed inside or near the user's ears is defined as the first mode, and a state where the display unit of the wearable computing device is not placed in front of the user's eye, while the audible information output unit is placed inside or near the user's ears is defined as the second mode. Herein, when a display position of an image including drawings, text, and so on, is within a viewing range of the user, it may be determined that the display unit of the wearable computing device 110 is placed in front of the user's eyes. Most particularly, a case where the wearable computing device 110 is normally worn on the user's face, as shown in (a) of FIG. 2, is defined as the first mode, and a case where the wearable computing device 110 is placed (or slipped) on the user's head, as shown in (b) of FIG. 2, is defined as the second mode. However, this is merely an example given to facilitate the understanding of the present specification, and, therefore, it will also be apparent that the definition can be made vice versa.

According to another exemplary embodiment of the present specification, the second mode may be defined as the second mode only when the wearable computing device 110 is changed the state of being worn on the user's face to the state of being slipped (or placed) on the user's head, or the second mode may be defined as the second mode only when the wearable computing device 110 is sensed to be placed on the user's head regardless of whether or not the wearable computing device 110 has been changed to the state of being worn on the user's face.

At this point, since whether to define the second mode only in the state where the wearable computing device 110 is changed the state of being worn on the user's face to the state of being slipped (or placed) on the user's head, or to define the second mode only in the state where the wearable computing device 110 is directly placed on the user's head from an unworn state may be optionally decided by the system designer, the present specification will not be limited only to the example presented herein.

According to yet another embodiment of the present specification, the second mode may also be defined as a state where the wearable computing device 110 is changed the state of being worn on the user's face to a position other than the top of the user's head, e.g., a state of being hung on the back of the user's head.

Additionally, when determining the first mode and the second mode, it will be assumed that power is being supplied to the wearable computing device 110. Thereafter, when deciding the first mode and the second mode, even when the description on the power is omitted, it will be evident and apparent that power is being supplied to the wearable computing device 110.

FIG. 4 illustrates a block diagram showing a structure of a wearable computing device according to an exemplary embodiment of the present specification.

The wearable computing device 110 of FIG. 4 may include a controller 410, a receiving unit 411, a visual information processing unit 412, a display unit 413, a speaker 415, a detecting unit 416, a converter 417, a camera unit 418, and a storage unit 419. Herein, the speaker 415 is also referred to as the audible information output unit.

The controller 410 is connected to each block shown in FIG. 4 by a signal line and controls each block shown in FIG. 4.

For example, when the wearable computing device 110 is detected to be in the first mode, in a power on state, the controller 410 controls the respective blocks, so that visual information can be displayed. Additionally, when the wearable computing device 110 is detected to be in the second mode, in a power on state, the controller 410 controls the respective blocks, so that visual information can be converted to audible information, thereby being outputted the converted audible information to the speaker.

The receiving unit 411 receives visual information and/or audible information, which is provided from at least one of the information providing devices 120-140, the external storage medium 110-1, and the internal storage unit 419 and then outputs the received information to the visual information processing unit 412 and/or the audible information processing unit 414. For simplicity, in the present specification, the storage unit 419 and the external storage medium 110-1 that provide the visual information and/or the audible information to the wearable computing device 110 are also referred to as the information providing device. Additionally, the camera unit 418 may also correspond to the information providing device.

At this point, according to the exemplary embodiment of the present specification, when the visual information and the audible information are multiplexed, the receiving unit 411 may also perform a function of demultiplexing the visual information and the audible information from the multiplexed information.

Additionally, the receiving unit 411 outputs the received or demultiplexed visual information to the visual information processing unit 412, and the receiving unit 411 outputs the received or demultiplexed audible information to the audible information processing unit 414.

The audible information processing unit 414 audio-processes the inputted audible information and outputs the audio-processed information to the speaker 415.

In the first mode, the visual information processing unit 412 video-processes the inputted visual information and outputs the video-processed information to the display unit 413.

The display unit 413 may correspond to a liquid crystal display, a thin film transistor liquid crystal display, a light emitting diode, an organic light emitting diode, a flexible display, a three-dimensional display (3D display), and so on. Additionally, the display unit 413 may also correspond to an empty space (or the air) or a transparent glass that can display a virtual display screen. More specifically, any object that can visually deliver information to a human being may be used as the display unit 413. Herein, information corresponds to texts, signs (or characters), images, and so on. The storage unit 419 may store a program for performing operations of the controller 410, and the storage unit 419 may also temporarily store visual information and/or audible information. If the information providing device corresponds to a smart phone, the visual information and/or the audible information may correspond to a phone book, a message, a still image, a moving picture image, and so on. The storage unit 419 may also store a moving picture image or a still image, which is acquired through the camera unit 418. The moving picture image or the still image, which is acquired through the camera unit 418, may be provided to the storage unit 419 in order to be provided to the user or may be directly provided to the receiving unit 411. The moving picture image or the still image, which is acquired through the camera unit 418, may also be stored in the external storage medium 110-1. The storage unit 419 may correspond to a RAM (Random Access Memory), an SRAM (Static Random Access Memory), a ROM (Read Only Memory), an EEPROM (Electrically Erasable Programmable Read Only Memory), a PROM (Programmable Read Only Memory), and so on. Additionally, the wearable computing device 110 may operate in association with a web storage performing the storage function of the storage unit 419 within the internet.

Meanwhile, in the second mode, the visual information processing unit 412 outputs the inputted visual information to the converter 417.

The converter 417 converts the inputted visual information to audible information and outputs the converted audible information to the audible information processing unit 414. Based upon the control of the controller 410, the converter 417 may read and output audible information respective to visual information from the storage unit 419, or the converter 417 may use an embedded application (or program) so as to generate audible information respective to the visual information. Additionally, a notification message or an alarm message may be stored in advance in the form of a voice at the point of shipping the wearable computing device 110, or the notification message or the alarm message may be stored in the storage unit 419 by the user via personal recording.

According to another exemplary embodiment of the present specification, in the second mode, the converter 417 may directly receive visual information from the receiving unit 411 and convert the received visual information to audible information. In this case, depending upon whether the wearable computing device 110 is in the first mode or in the second mode, the controller 410 controls the operations of the visual information processing unit 412 and the display unit 413. For example, in the first mode, the controller 410 may perform control operations so that the visual information processing unit 412 and the display unit 413 can be operated, and, in the second mode, the controller 410 may perform control operations so that the visual information processing unit 412 and the display unit 413 cannot be operated.

As described above, in the second mode, the visual information may be received from the receiving unit 411, or the visual information may be received from the visual information processing unit 412, and since this is an option that can be selected by the system designer, the present specification will not be limited only to the exemplary embodiments presented herein.

The audible information processing unit 414 performs audio-processing on the audible information that is converted and outputted by the converter 417 and outputs the audio-processed information to the speaker 415. Herein, according to the exemplary embodiment of the present specification, the audible information outputted to the speaker 415 may be configured in the form of a voice.

At this point, according to the exemplary embodiment of the present specification, if the audible information of the receiving unit 411 and the audible information of the converter 417 are inputted to the audible information processing unit 414 at the same time, the audible information processing unit 414 selects one of the two audible information types, so as to perform audio-processing on the selected information and then to output the audio-processed information to the speaker 415. For example, a default mode may be decided, and, when the two types of audible information are simultaneously inputted, the audible information processing unit 414 may select the audible information outputted from a block, which is decided to operate in the default mode, and may process the selected audible information, thereby outputting the audio-processed information to the speaker 415. Additionally, the default mode may allow the user to perform modifications (or changes) by using a menu, or a button, and so on, or the default mode may allow the user to select one of multiple audible information types in real-time.

More specifically, in the second mode, the visual information is converted to a voice and then outputted the voice to the speaker 415.

In the second mode, the display of the visual information is optional. For example, in the second mode, the visual information may not be video-processed, and the display of the visual information may not be performed. Most particularly, in a mobile device (or terminal), since reducing power consumption is the most important issue, in the second mode, it is preferable that the visual information is not video-processed and displayed.

However, according to another exemplary embodiment of the present specification, while the visual information is converted to the audible information and then audio-processed, thereby being outputted to the speaker, the visual information may be video-processed and then outputted to the display unit 413 at the same time. In this case, since the user is incapable of viewing the visual information that is displayed on the display unit 413, this may result in an unnecessary waste of power (or energy). However, since the user's preference should also be taken into consideration, in the second mode, the display of the visual information may be selected by the user.

Meanwhile, according to the other exemplary embodiment of the present specification, a stand-by (i.e., waiting) state may be maintained in the second mode. More specifically, neither one of the visual information and the audible information is provided to the user. The user may slip (or place) the wearable computing device 110 on his (or her) head, or the user may hang the wearable computing device 110 on the back of his (or her) head, for multiple purposes. For example, the user may wish to only listen to the necessary information through his (or her) ears, while reducing fatigue in the user's eyes, or the user may place the wearable computing device 110 on his (or her) head or hang the wearable computing device 110 on the back of his (or her) head in order to reduce fatigue in the user's eyes and ears or simply in order to be fashionable, and in this case, the user may not wish to be provided with any type of information.

For this, according to an embodiment of the present specification, in the second mode, the user may be allowed to select from an audible mode, which converts visual information to audible information and provides the converted audible information to the user, and a stand-by mode, which does not provide any type of information to the user. The audible mode is merely a term that has been selected and used to facilitate the understanding of the present specification, and, therefore, it will be apparent that this term may be varied in accordance with the intentions of anyone skilled in the art, custom, or an advent of a novel technology. Therefore, it should be understood that this term shall be defined based upon the underlying significance of the term and also based upon the overall context of the present specification, and not be defined simply by the meaning of the term itself In the present specification, the audible mode and the stand-by mode will be collectively referred to as an output mode for simplicity.

The audible mode and the stand-by mode may be selected by the user in advance or in real-time by using a button, which is installed on a portion of the wearable computing device 110, or by using a menu, which is displayed on the display unit 413. According to an exemplary embodiment of the present specification, when only On/Off functions of the audible mode are given, and when an Audible Mode On option is selected by using the menu or the button, the audible mode may be set up, and, when an Audible Mode Off option is selected, the stand-by mode may be set up. According to another exemplary embodiment of the present specification, when both the audible mode and the stand-by mode are provided, and, when the audible mode is selected, the audible mode may be set up, and when the stand-by mode is selected, the stand-by mode may be set up.

According to yet another exemplary embodiment of the present specification, the audible mode is decided in advance as a default mode, and when the wearable computing device 110 is changed the first mode to the second mode, visual information may be automatically converted to audible information so as to be processed, thereby being outputted to the speaker 415. And, when the user selects the Audible Mode Off or the stand-by mode by using the button or the menu, the wearable computing device 110 does not provide neither of the visual information or the audible information.

According to yet another exemplary embodiment of the present specification, in the first mode, the user may turn an output of the visual information and/or the audible information on/off. At this point, in the first mode, the on/off state of the visual information and/or the audible information may be selected by the user in advance or in real-time by using a menu or a button. In the first mode, if an off state of the visual information in selected, the visual information may be converted to audible information and may then be provided to the user through the audible information outputting unit. In the first mode, when the off state of the visual information is selected, whether or not to convert the visual information to audible information and then to provide the converted audible information to the user may also be selected by the user in advance or in real-time by using a menu or a button. In the first mode, if an off state of the audible information is selected, settings may be made so that only the audible information is not outputted. Additionally, according to an exemplary embodiment of the present specification, in the first mode, if an off state of both the visual information and the audible information is selected, the wearable computing device is changed to the stand-by mode. In the stand-by mode, when an on state of the visual information and/or the audible information is selected, or when the power of the wearable computing device is turned off and then turned on, visual information and/or audible information may be normally provided to the user.

At this point, the detecting unit 416 detects (or senses) the state of the wearable computing device 110 and outputs the detection information to the controller 410. The controller 410 then uses the detection information of the detecting unit 416, so as to determine whether the wearable computing device 110 is in the first mode or in the second mode, and then, the controller 410 controls the processing of the visual information based upon the determined result.

The detecting unit 416 detects (or senses) whether the wearable computing device 110 is in the state of being worn on the user's face, whether the wearable computing device 110 has changed the state of being worn on the user's face to the state of being placed on the user's head, whether the wearable computing device 110 is in the state of being placed (or slipped) on the user's head, whether the wearable computing device 110 is changed the state of being slipped on the user's head to the state of being worn on the user's face, and, in order to do so, the detecting unit 416 uses one or more sensors. Herein, the state where the wearable computing device 110 is worn on the user's face will be referred to as the first mode, and the state where the wearable computing device 110 is placed (or slipped) on the user's head will be referred to as the second mode. And, when the wearable computing device 110 changes the state of being worn on the face to the state of being worn on the head, this may be referred to as the wearable computing device 110 changed the first mode to the second mode, and when the wearable computing device 110 changes the state of being worn on the head to the state of being worn on the face, this may be referred to as the wearable computing device 110 changed the second mode to the first mode.

(a) of FIG. 5 illustrates an example of the wearable computing device 110 being in the state of being worn on the user's face (i.e., first mode) and then being repositioned (or shifted or changed) on the user's head, and (b) of FIG. 5 illustrates an example of the wearable computing device 110 being worn on the face, as shown in (a) of FIG. 5, and then being placed (or slipped) on the user's head (i.e., second mode).

According to an exemplary embodiment of the present specification, in order to detect (or sense) such state, at least 3 detecting means 310, 320, and 330 may be used. According to the exemplary embodiment of the present specification, each of the detecting means 310, 320, and 330 is equipped with one or more sensors.

(a) to (d) of FIG. 6 respectively show examples of first to third detecting means 310, 320, and 330 equipped in diverse forms of the wearable computing device 110. The wearable computing device 110 may largely be made up of a frame part, a right leg part, and a left leg part.

The first to third detecting means 310-330 may include at least one detecting means, such as a gravity sensor, a geomagnetic (or terrestrial magnetism) sensor, a motion sensor, a gyroscope sensor, an acceleration sensor, an infrared sensor, an inclination sensor, a brightness sensor, an altitude sensor, an odor sensor, a temperature sensor (or thermal sensor), a depth sensor, a pressure sensor, a banding sensor, a Global Positioning System (GPS) sensor, a proximity sensor, a touch sensor, and so on.

According to an exemplary embodiment of the present specification, the first detecting means 310 may be provided on an edge portion of the right leg part of the wearable computing device 110, the second detecting means 320 may be provided on an edge portion of the left leg part of the wearable computing device 110, and the third detecting means 330 may be provided on a nose rest part of the wearable computing device 110. The locations of the first to third detecting means 310~330 are merely examples given to facilitate the understanding of the description of the present specification, and, therefore, the detecting means may be located at any location that can detect (or sense) the current state of the wearable computing device 110.

The detecting unit 416 uses at least one of the first to third detecting means 310~330, so as to detect whether or not the wearable computing device 110 is correctly (or normally) worn on the face, and the detecting unit 416 may also detect whether the position of the wearable computing device 110 has moved from the face to the head, or from the head to the face, and also whether the wearable computing device 110 is in the state of being placed (or slipped) on the user's head.

Meanwhile, according to the exemplary embodiment of the present specification, the visual information and/or the audible information, which is recorded (or captured) by the camera unit 418, may also be inputted to the receiving unit 411 through the storage unit 419 or may be directly inputted to the receiving unit 411. Among the information recorded by the camera unit 418, the receiving unit 411 outputs the visual information to the visual information processing unit 412 and outputs the audible information to the audible information processing unit 414. Herein, the visual information that is recorded by the camera unit 418 may correspond to a video clipping included in a moving picture image or a still image such as a photographic image. Additionally, the audible information may correspond to an audio portion included in the moving picture image. At this point, in the first mode, the visual information processing unit 412 performs video-processing on the visual information recorded by the camera unit 418 and outputs the video-processed visual information to the display unit 413.

Conversely, in the second mode, the visual information processing unit 414 outputs the visual information recorded by the camera unit 418 to the converter 417. At this point also, according to the exemplary embodiment of the present specification, the visual information processing unit 414 does not perform any processing operation for displaying the visual information, which is recorded by camera unit

418. More specifically, according to the exemplary embodiment of the present specification, even when the wearable computing device 110 is slipped on the user's head, the wearable computing device 110 may convert the visual information, which is recorded by the camera unit 418, to audible information, and then provided the converted audible information to the user. The application of this embodiment is more effective when the user wishes to be provided with audio road guidance information or to be informed of urgent and/or unexpected situations, while the wearable computing device 110 is placed on the user's head.

Based upon the control of the controller 410, the converter 417 converts visual information to audible information and outputs the converted audible information to the audible information processing unit 414. At this point, the audible information that is outputted from the converter 417 may correspond to the audio road guidance information or may correspond to notification information notifying the user of urgent and/or unexpected situations. For this, it will be assumed that the wearable computing device 110 is provided with a GPS function, or that a map is stored in the storage unit 419 of the wearable computing device 110. If the information providing device or the wearable computing device 110 can be connected to the internet, the corresponding device may use a map provided by a specific website.

According to the exemplary embodiment of the present specification, in order to record the surrounding of the user, even when the wearable computing device 110 is placed on the user's head, a camera provided with a wide viewing angle is used. Additionally, by using the gravity sensor, the geomagnetism sensor, the acceleration sensor, the gyroscope sensor, and so on, a moving direction and a rotating direction of the user, a recording direction of the camera, and so on, may be detected (or sensed), so as to control the viewing angle of the camera. The controller 410 may use the current location of the user, the recording direction of the camera, the viewing angle of the camera, and so on, so as to determine what type of an object is included in the image that is currently recorded. Thereafter, by using the determined result, the controller 410 control the converter 417 in order to provide the user with road guidance or to inform the user of unexpected and/or urgent situations in the form of a voice. For example, even when the wearable computing device 110 is slipped on the user's head, the user may be provided with vocal road guidance, such as "Make a right-turn at 30 m ahead."

Additionally, the controller 410 may receive date and time information through a GPS satellite, and, when the wearable computing device 110 is in the first mode, the alarm message may be provided to the user in the form of a text, which is displayed on the display unit 413, and, when the wearable computing device 110 is in the second mode, the alarm message may be provided to the user in the form of a voice, which is outputted to the speaker 415. For example, when the wearable computing device 110 is in the second mode, the alarm message or the notification message, such as "Go to work", "Wake up", "You have an appointed at ~", and so on, may be provided to the user in the form of a voice. The alarm message or the notification message may be stored in advance at the point of shipping the wearable computing device 110, or the alarm message or the notification message may be personally recorded and stored by the user.

Meanwhile, according to the exemplary embodiment of the present specification, the speaker 415 may be equipped with at least one of air conduction speakers and bone conduction speakers.

(a) of FIG. 7 illustrates an example of the wearable computing device equipped with the bone conduction speakers, (b) of FIG. 7 illustrates an example of the wearable computing device equipped with the air conduction speakers, and (c) of FIG. 7 illustrates an example of the wearable computing device equipped with both of the bone conduction speakers and the air conduction speakers. According to an exemplary embodiment of the present specification, in (c) of FIG. 7, at least one of the two speakers is automatically selected by the system or selected by the user, and the audible information is outputted from the selected speaker.

The bone conduction speakers 511, 512 may be positioned in diverse locations capable of easily providing the user with audible information, which is converted in the form of frequency resonance. According to the exemplary embodiment of the present specification, as shown in (a) to (c) of FIG. 7, in the wearable computing device 110, the speakers are installed on an inside or outside of an edge portion of both leg parts, which come in close contact with the user's cranial bone (or skull).

More specifically, the bone conduction speakers 511, 512 are operated by audible information, e.g., an audio signal, which is outputted from the audible information processing unit 414, thereby being delivered bone conduction sound wave to the user's cranial bone, and being delivered frequency type resonance to the user's internal ear (or inner ear).

In order to do so, according to the exemplary embodiment of the present specification, each of the bone conduction speakers 511, 512 includes an amp (or amplifier) unit and a bone conduction oscillator.

The amp unit amplifies audible information and provides the amplified audible information to the bone conduction oscillator, and the bone conduction oscillator oscillates (or resonates) due to the amplified audible information. Thereafter, the bone conduction sound wave, which is generated by the oscillation of the bone conduction oscillator, is conducted to the user's cranial bone, thereby enabling the frequency form resonation (or oscillation) to be delivered to the inner ear of the user. Thus, the user may be capable of hearing the audible information without harming the user's eardrums.

When using the bone conduction speakers 511, 512, a level of freedom in designing the wearable computing device 110 may be enhanced, and a comfortable fit may be provided to the user, while problems of headaches, hearing difficulties, and so on, may be prevented and damage in the user's eardrums may also be prevented, and by using such speakers hearing impaired user's having damaged eardrums may also be provided with normal hearing.

Meanwhile, in the present specification, the air conduction speakers 521, 522 may also be used. According to the exemplary embodiment of the present specification, the air conduction speakers 521, 522 are configured in the form of earphones. The air conduction speakers 521, 522 resonate (or oscillate) the air in accordance with audible information, e.g., audio signal, which is outputted from the audible information processing unit 414, so as to generate sound waves. More specifically, the resonance of the sound delivered through the air is delivered to the eardrum, which is located inside of the ear, and the oscillation of the eardrum is delivered to a snail (or cochlea), which consists of a helical form, after passing through 3 bones located inside the eardrum. The snail is filled with a fluid, which is referred to as lymph fluid, and oscillation occurring in this fluid is changed to electrical signals, which are delivered to auditory nerves, thereby allowing the user's brain to acknowledge the corresponding sound.

Meanwhile, according to exemplary embodiment of the present specification, when the user listens to the audible information respective to the visual information, while wearing the wearable computing device 110 on his (or her) head, and, then, when the user properly wears the wearable computing device 110 back on his (or her) face, at least a portion of the visual information, which was converted to the audible information, is displayed. More specifically, when the user listens to the audible information respective to the visual information, in the state where the wearable computing device 110 is slipped on the user's head, the user may wear the wearable computing device 110 back on his (or her) face simply out of curiosity on the visual information respective to the audible information. For example, when the user is provided with broadcasting of a baseball game in the form of a voice, while wearing the wearable computing device 110 on his (or her) head, and when a player has hit a homerun, the user may suddenly wish to see the homerun scene (or footage) in person, and, then, the user may wear the wearable computing device 110 back on his (or her) face. In this case, in the present specification, by displaying the footage of the homerun on the display unit 413, the user may be capable of viewing the homerun scene, which he (or she) has just missed because of wearing the wearable computing device 110 on his (or her) head. According to the exemplary embodiment of the present specification, in order to do so, in the second mode, the visual information that is converted to the audible information is stored in the internal storage unit 419 or in the external storage medium 110-1. At this point, the storage of the visual information is decided based upon the storage capacity. For example, visual information may be stored for only one hour, or only a portion of the visual information or main information of the visual information (e.g., an I picture or a thumbnail image) may be stored. Additionally, when the visual information that has been converted to audible information is composed of multiple events, the visual information corresponding to all of the events may be displayed, or the visual information corresponding only to a specific event in accordance with a predetermined condition may be displayed. According to an exemplary embodiment of the present specification, when the visual information that has been converted to the audible information in the second mode is composed of multiple events, the visual information of at least one event may be displayed by an order of the highest priority level. According to another exemplary embodiment of the present specification, when the visual information that has been converted to the audible information in the second mode is composed of multiple events, the visual information of at least one event may be displayed by an order of events most recently provided to the user as audible information.

In the description of the present specification, when the visual information that has been converted to the audible information in the second mode is displayed in the first mode, the visual information may be displayed in diverse formats. For example, the visual information may be displayed in the form of at least one of a summary of a specific event, the overall content, a highlight, a thumbnail, and a fast screen.

Furthermore, when shifting from the second mode to the first mode, a function of displaying the visual information, which was converted to the audible information in the second mode, may be selected by the user through a menu or button of the wearable computing device 110.

FIG. 8 illustrates a flow chart showing a user interface method according to an exemplary embodiment of the present specification, and, herein, it will be assumed that power is supplied to the wearable computing device 110.

At this point, the controller 410 uses detection information of the detecting unit 416, so as to determine whether or not the wearable computing device 110 is in the first mode, which corresponds to the state where the wearable computing device 110 is worn on the user's face (S611).

In step S611, when the wearable computing device 110 is determined to be in the first mode, the visual information processing unit 412 performs video-processing on the inputted visual information and outputs the video-processed visual information to the display unit 413, and the audible information processing unit 414 performs audio-processing on the inputted audible information and outputs the audio-processed audible information to the speaker 415 (S612).

In step S611, when the wearable computing device 110 is determined not to be in the first mode, the controller 410 determines whether or not the wearable computing device 110 is in the second mode, which corresponds to the state where the wearable computing device 110 is slipped on the user's head (S613).

In step S613, when the wearable computing device 110 is determined to be in the second mode, the visual information is converted to the audible information through the converter 417 (S614), and, then, the converted audible information is outputted through the speaker 415 (S615). At this point, according to the exemplary embodiment of the present specification, the converted audible information is outputted in the form of a voice.

FIG. 9 illustrates a flow chart showing a user interface method according to another exemplary embodiment of the present specification, and, herein, it will be assumed that power is supplied to the wearable computing device 110. Additionally, the flow chart of FIG. 9 is more effective when applied to a case when any one of the audible mode and the stand-by mode can be selected as the output mode, in the second mode.

More specifically, the controller 410 uses detection information of the detecting unit 416, so as to determine whether or not the wearable computing device 110 is in the first mode, which corresponds to the state where the wearable computing device 110 is worn on the user's face (S711).

In step S711, when the wearable computing device 110 is determined to be in the first mode, the visual information processing unit 412 performs video-processing on the inputted visual information and outputs the video-processed visual information to the display unit 413, and the audible information processing unit 414 performs audio-processing on the inputted audible information and outputs the audio-processed audible information to the speaker 415 (S712).

In step S711, when the wearable computing device 110 is determined not to be in the first mode, the controller 410 determines whether or not the wearable computing device 110 is in the second mode, which corresponds to the state where the wearable computing device 110 is slipped on the user's head (S713).

In step S713, when the wearable computing device 110 is determined to be in the second mode, it is determined whether or not the output mode corresponds to the audible mode (S714).

In step S714, when the output mode is determined to be the audible mode, the visual information is converted to the audible information through the converter 417 (S715), and, then, the converted audible information is outputted through the speaker 415 (S716). At this point, according to the exemplary embodiment of the present specification, the converted audible information is outputted in the form of a voice.

In step S714, when the output mode is determined not to be the audible mode, the controller 410 maintains the wearable computing device 110 in a stand-by state (S717).

Even if the wearable computing device 110 is determined not to be in the first mode, in step S711, or if the wearable computing device 110 is determined not to be in the second mode in step S713, the controller 410 maintains the wearable computing device 110 in the stand-by state (S717).

FIG. 10 illustrates a flow chart showing a user interface method according to yet another exemplary embodiment of the present specification, and, herein, it will be assumed that power is supplied to the wearable computing device 110.

FIG. 10 illustrates an example of a processing method of visual information when the wearable computing device is changed the second mode to the first mode.

More specifically, the controller 410 uses detection information of the detecting unit 416, so as to determine whether or not the wearable computing device 110 is in the first mode, which corresponds to the state where the wearable computing device 110 is worn on the user's face (S811).

In step S811, when the wearable computing device 110 is determined to be in the first mode, the visual information processing unit 412 performs video-processing on the inputted visual information and outputs the video-processed visual information to the display unit 413, and the audible information processing unit 414 performs audio-processing on the inputted audible information and outputs the audio-processed audible information to the speaker 415 (S812).

In step S811, when the wearable computing device 110 is determined not to be in the first mode, the controller 410 determines whether or not the wearable computing device 110 is in the second mode, which corresponds to the state where the wearable computing device 110 is slipped on the user's head (S813).

In step S813, when the wearable computing device 110 is determined to be in the second mode, the visual information is converted to the audible information through the converter 417 (S814), and, then, the converted audible information is outputted through the speaker 415 (S815). At this point, according to the exemplary embodiment of the present specification, the converted audible information is outputted in the form of a voice.

In step S815, while the audible information respective to the visual information is outputted in the form of a voice, the controller 410 uses the detection result of the detecting unit 416, so as to determine whether or not the wearable computing device 110 is changed the second mode to the first mode (S816).

In step S816, when it is determined that the wearable computing device 110 is changed the second mode to the first mode, the visual information, which was converted to the audible information through steps S814 and S815, is video-processed and then displayed on the display unit 413.

At this point, when the visual information converted to audible information is composed of multiple events, the visual information corresponding to all of the events may be displayed, or the visual information corresponding only to a specific event in accordance with a predetermined condition may be displayed. For example, when the visual information that has been converted to the audible information in the second mode is composed of multiple events, the visual information of at least one event may be displayed by an order of the highest priority level, and the visual information of at least one event may be displayed by an order of events most recently provided to the user as audible information.

When the visual information that has been converted to the audible information in the second mode is displayed in the first mode, the visual information may be displayed in diverse formats. For example, the visual information may be displayed in the form of at least one of the summary of a specific event, the overall content, the highlight, the thumbnail, and the fast screen.

In the present specification, when the display unit of the wearable computing device is positioned in front of the user's eye, while the audible information output unit is placed inside or near the user's ears, and, then, when the display unit of the wearable computing device is no longer positioned in front of the user's eyes, by converting visual information to audible information configured in the form of a voice and by providing the converted audible information to the user, the user may be continuously provided with information. Most particularly, the wearable computing device according to the present specification may be worn on the user's face or may be slipped (or placed) on the user's head. When the wearable computing device is in a state of being slipped on the user's head, by converting visual information to audible information configured in the form of a voice and by providing the converted audible information to the user, the user may be continuously provided with the requested (or wanted) information without any interruption, even when the wearable computing device is slipped on the user's head.

It will be apparent that the present specification will not be limited only to the above-described exemplary embodiments of the present specification, and, as it may be known in the appended claims of the present specification, various modifications and variations can be made in the present specification without departing from the spirit or scope of the specifications and the scope of the detailed description of the present specification.

What is claimed is:

1. A wearable computing device receiving at least one of visual information and first audible information and providing the received information to a user, the wearable computing device comprising:
   a detecting unit to detect a state of the wearable computing device;
   an audible information output unit to output the first audible information;
   a display unit to display the visual information,
   wherein the state corresponds to at least one of a first mode, and a second mode,
   wherein the first mode corresponds to a state where the display unit is placed in front of the user's eyes, while the audible information output unit is placed inside or near the user's ears, and
   wherein the second mode corresponds to a state where the display unit is not placed in front of the user's eyes, while the audible information output unit is placed inside or near the user's ears; and
   a controller to control corresponding operations based on the detected state,
   wherein, when the detected state corresponds to the first mode, the display unit displays the visual information and the audible information output unit outputs the first audible information that goes with the visual information,
   wherein, when the detected state corresponds to the second mode, the controller converts the visual information into second audible information other than the first audible information in the second mode, the second audible information being audible information of a voice format, wherein the audible information output unit outputs the first audible information and the second audible information, wherein the second audible information that is converted from the visual information includes information related to at least a content or an application being executed in the first mode, wherein the controller performs control operations so that at least a portion of the visual information that had been converted to the second audible information in the second mode can be displayed in response to changing from the second mode to the first mode, and wherein, when the visual information that had been converted to the second audible information in the second mode corresponds to multiple events, the controller performs control operations so that visual information of at least one event can be displayed by an order of a highest priority level.

2. The wearable computing device of claim 1, wherein the first mode corresponds to a state where the wearable computing device is worn on the user's face, and wherein the second mode corresponds to a state where the wearable computing device is placed on the user's head.

3. The wearable computing device of claim 1, wherein the visual information corresponds to at least one of an image, a text message, a notification message, subtitle information, and schedule information.

4. The wearable computing device of claim 1, wherein the at least one of the visual information and the first audible information is received from an information providing device including a camera unit capturing the visual information, and wherein the controller controls converting the captured visual information to the second audible information of the voice format when the detected state corresponds to one of a change from the first mode to the second mode and the second mode.

5. The wearable computing device of claim 4, wherein the second audible information includes at least one of road guidance information and urgent and/or unexpected situation guidance information.

6. The wearable computing device of claim 5, wherein the second audible information of the voice format is generated based on at least one of the captured visual information, current location information, and map information.

7. The wearable computing device of claim 4, wherein, when an output mode corresponds to an audible mode in the second mode, the controller performs control operations so that the second audible information can be outputted to the audible information output unit, and wherein, when the output mode corresponds to a stand-by mode in the second mode, the controller performs control operations so that the visual information and the first and second audible information cannot be provided to the user.

8. The wearable computing device of claim 1, wherein at least one of the visual information and the first audible information is received from an information providing device, the wearable computing device further comprising:

a visual information processing unit configured to perform video-processing on the visual information provided by the information providing device; and an audible information processing unit configured to perform audio-processing on the first audible information provided by the information providing device.

9. The wearable computing device of claim 8, wherein, when the detected state corresponds to the first mode, the controller performs control operations so that the visual information processing unit and the display unit can be operated, and wherein, when the detected state corresponds to one of a change from the first mode to the second mode and the second mode, the controller performs control operations so that the visual information processing unit and the display unit cannot be operated.

10. The wearable computing device of claim 8, wherein, when the detected state corresponds to the first mode, the controller performs control operations so that the first audible information processed by the audible information processing unit can be outputted to the audible information output unit, and wherein, when the detected state corresponds to one of a change from the first mode to the second mode and the second mode, the controller performs control operations so that the first audible information processed by the audible information processing unit and the second audible information can be outputted to the audible information output unit.

11. The wearable computing device of claim 1, further comprising:

a storage unit configured to store at least a portion of the visual information that had been converted to the second audible information in the second mode, wherein the storage unit stores at least a portion of the visual information that had been converted to the second audible information in the second mode only during a predetermined period of time based upon the control of the controller.

12. The wearable computing device of claim 1, wherein, when the visual information that had been converted to the second audible information in the second mode corresponds to the multiple events, the controller performs control operations so that the visual information of the at least one event can be displayed by an order of events most recently provided to the user as audible information.

13. The wearable computing device of claim 1, wherein the controller performs control operations so that the visual information that had been converted to the second audible information in the second mode can be displayed in the form of at least one of a summary, an overall content, a highlight, a thumbnail, and a fast screen.

14. The wearable computing device of claim 1, wherein the detecting unit comprises at least one sensor sensing movements of the wearable computing device and status of the wearable computing device, and wherein the sensing unit is provided in at least one of a nose resting part, an edge portion of a right leg part, and an edge portion of a left leg part of the wearable computing device.

15. The wearable computing device of claim 1, wherein the audible information output unit comprises at least one of an air conduction speaker and a bone conduction speaker, and wherein the first audible information and the second audible information are provided to the user through at least one of the air conduction speaker and the bone conduction speaker.

16. The wearable computing device of claim 1, wherein, when the detected state corresponds to the second mode, the audible information output unit outputs the first audible information and the second audible information.

17. The wearable computing device of claim 1, wherein the detected state is defined as the second mode at least when the detected state corresponds to a state where the display unit is placed on the user's head and the audible information output unit is placed inside or near the user's ears directly from an unworn state, or when the detected state corresponds to a state after the display unit is changed from the user's face to the user's head, the audible information output unit is placed inside or near the user's ears, and then a predetermined time elapses.

18. In a user interface method of a wearable computing device receiving at least one of visual information and first audible information from an information providing device and providing the received information to a user, the user interface method of the wearable computing device comprising:

detecting a state of the wearable computing device, wherein the state corresponds to at least one of a first mode, and a second mode, wherein the first mode corresponds to a state where a display unit is placed in front of the user's eyes, while an audible information output unit is placed inside or near the user's ears, and wherein the second mode corresponds to a state where the display unit is not placed in front of the user's eyes, while the audible information output unit is placed inside or near the user's ears; and controlling corresponding operations based on the detected state, wherein, when the detected state corresponds to the first mode, the visual information is displayed through the display unit and the first audible information is outputted through the audible information output unit, the first audible information being audible information that goes with the visual information, wherein, when the detected state corresponds to the second mode, the visual information is converted into second audible information other than the first audible information in the second mode, the second audible information being audible information of a voice format, wherein the first audible information and the second audible information are outputted through the audible information output unit, wherein the second audible information that is converted from the visual information includes information related to at least a content or an application being executed in the first mode, wherein the controller performs control operations so that at least a portion of the visual information that had been converted to the second audible information in the second mode can be displayed in response to changing from the second mode to the first mode, and wherein, when the visual information that had been converted to the second audible information in the second mode corresponds to multiple events, the controller performs control operations so that visual information of at least one event can be displayed by an order of a highest priority level.

\* \* \* \* \*